United States Patent [19]

Edvinsson

[11] Patent Number: 5,714,926
[45] Date of Patent: Feb. 3, 1998

[54] METHOD AND MEANS FOR PREVENTING TRESPASSING

[76] Inventor: Dick Edvinsson, Klevbergsvägen 14, S-179 60 Stenhamra, Sweden

[21] Appl. No.: 492,072

[22] PCT Filed: Feb. 2, 1994

[86] PCT No.: PCT/SE94/00078

§ 371 Date: Aug. 4, 1995

§ 102(e) Date: Aug. 4, 1995

[87] PCT Pub. No.: WO94/18650

PCT Pub. Date: Aug. 18, 1994

[30] Foreign Application Priority Data

Feb. 12, 1993 [SE] Sweden .......................... 9300467

[51] Int. Cl.⁶ ............................................ H04N 7/12
[52] U.S. Cl. ..................... 340/384.2; 340/384.4; 340/384.7; 340/384.72; 367/103; 367/139
[58] Field of Search .................. 340/384.2, 384.1, 340/384.3, 384.4, 384.7, 384.71, 384.72; 367/139, 103, 105

[56] References Cited

U.S. PATENT DOCUMENTS

| | | | |
|---|---|---|---|
| 3,612,211 | 10/1971 | Clark | 367/139 |
| 3,636,559 | 1/1972 | Del Grande et al. | 340/384 |
| 3,872,472 | 3/1975 | Moschgat | 340/384 |
| 3,893,106 | 7/1975 | Schulein | 340/384 |
| 4,001,817 | 1/1977 | Squires | 340/384.2 |
| 4,186,387 | 1/1980 | Moschgat | 340/384.2 |
| 4,386,341 | 5/1983 | Yamamoto | 367/139 |
| 4,484,315 | 11/1984 | Hall | 367/139 |
| 4,563,759 | 1/1986 | Hayakawa | 340/384.2 |
| 4,769,794 | 9/1988 | Beuter et al. | 367/139 |
| 4,965,552 | 10/1990 | Price et al. | 340/566 |
| 5,278,537 | 1/1994 | Carlo et al. | 340/384.1 |

FOREIGN PATENT DOCUMENTS

| | | |
|---|---|---|
| 2 556 485 | 6/1985 | France . |
| 2 166 277 | 4/1986 | United Kingdom . |
| 93/07600 | 4/1993 | WIPO . |

OTHER PUBLICATIONS

Graf, Rudolf F., Electronics Learning Dictionary, Copyright 1977, p. 525, p. 253, 1975.

*Primary Examiner*—Thomas Mullen
*Assistant Examiner*—Ashok Mannava
*Attorney, Agent, or Firm*—Jacobson, Price, Holman & Stern, PLLC

[57] ABSTRACT

Method and means for preventing trespassing and/or unauthorized staying in an area outdoors or indoors, e.g. in a building, part of a building, in vehicles, vessels, etc., sound signals with periodically varying frequencies with the variation of the frequencies out of phase are transmitted from several sound generators in such directions that the sound waves from the sound generator meet within the area to be protected.

8 Claims, 1 Drawing Sheet

# METHOD AND MEANS FOR PREVENTING TRESPASSING

BACKGROUND OF THE INVENTION

The present invention relates to a method for preventing trespassing and/or unauthorized staying in an area outdoors or indoors, e.g. in a building, part of a building, in vehicles, vessels, and the like.

Prior art alarms installed for protection of property against theft or damage have the disadvantage that the intruder can continue the activity until somebody reacts to the alarm and may thus also have time to finish the activity and leave the place before the alarm personnel reach the place.

There are also noise generating devices which are used for keeping away noxious animals and such, one example being disclosed in the French Patent Publication No 2556485. The device according to this publication can work with several sirens which can work with different frequencies and be controlled separately. It is said that this gives rise to an unbearable sound. However, it has been shown that animals such as rodents can get used to a noise and therefore return to the sound laden area. The device according to this publication is also said to be useful as a protective alarm. The human organ of hearing is however adjustable and also contains protective mechanisms which to a certain extent protect against high sounds, and consequently the usefulness of the means according to the French patent publication is highly unreliable also for this purpose.

SUMMARY OF THE INVENTION

The object of the present invention is to provide a method and a means for generating sound which is unendurable for humans and/or animals and which makes it impossible to stay within the field of operation of the means.

This is achieved with the method according to the present invention which is characterized in that sound generators transmit sound signals with periodically varying frequencies with the different frequency sound signals emitted by each sound generator being out of phase with respect to the sound signals emitted by the other sound generators in such directions that the sound waves from the sound generators meet within the area to be protected.

According to one embodiment of the invention, sound signals are transmitted with frequencies which periodically rise from and then return to the basic frequency.

According to another embodiment of the invention, sound signals are transmitted with frequencies successively rising from the basic frequency and abruptly falling back to the basic frequency.

According to a further embodiment of the invention the basic frequency for the sound signals are changed after predetermined time intervals. Hereby the risk of somebody quenching the sound signals with the aid of a counter sound generator is avoided.

According to a further embodiment of the invention a phase shift between the sound signals of in the order of milliseconds is used.

According to a further embodiment of the invention a sound level of 110 dB and up is used.

According to a further embodiment of the invention sound signals from at least four sound generators are used. Hereby use is made of the fact that the human organ of hearing possibly can endure three frequencies at the same time through the protective mechanisms, but that further simultaneous sound signals with different frequencies are not endured.

The invention also comprises means for accomplishing the method according to the invention, which is characterized in that it comprises several sound generators with control means for generating sound signals with periodically varying frequencies with the different frequency sounds being out of phase from sounds emitted by the other sound generators, whereby the sound generators are so directed that the sound waves from the sound generators meet within the area to be protected.

According to an embodiment of the means according to the invention the means comprises at least four sound generators.

DESCRIPTION OF THE PREFERRED EMBODIMENTS

The invention will now be described more in detail in connection with the presently preferred embodiment illustrated in FIGS. 1 and 2.

Figure 1:
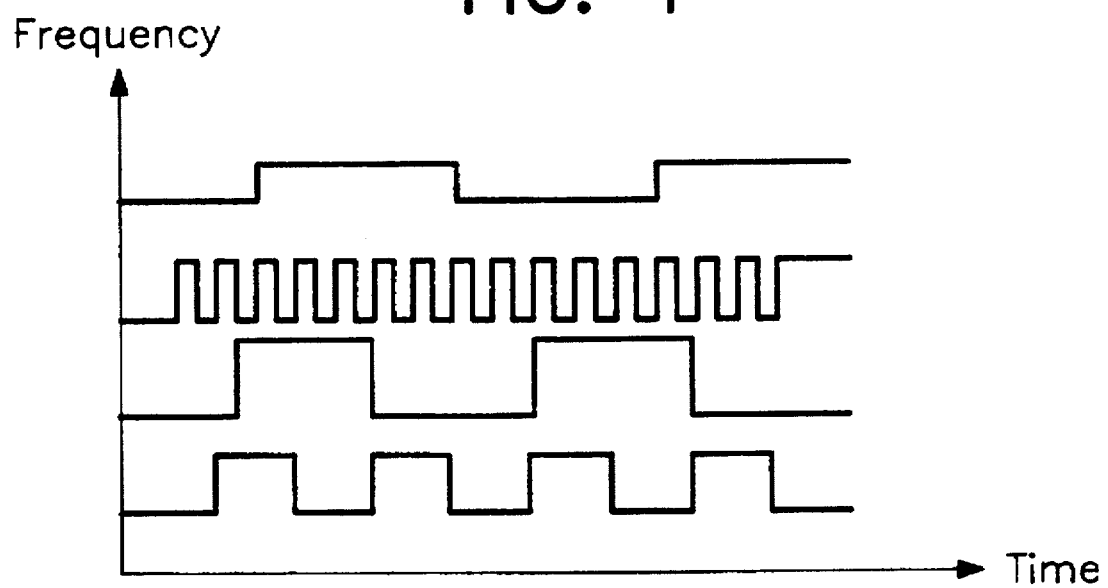
FIG. 1 graphically illustrates four different sound signals respectively emitted by four different sound generators in accordance with a preferred embodiment of the present invention.

With reference to FIG. 1, the intention of the invention is that the sound generators upon activation through some form of indication means, such as IR detectors, shall transmit sound signals so tuned that the total sound effect will get an intruder to immediately remove himself from the sound laden area.

Figure 2:
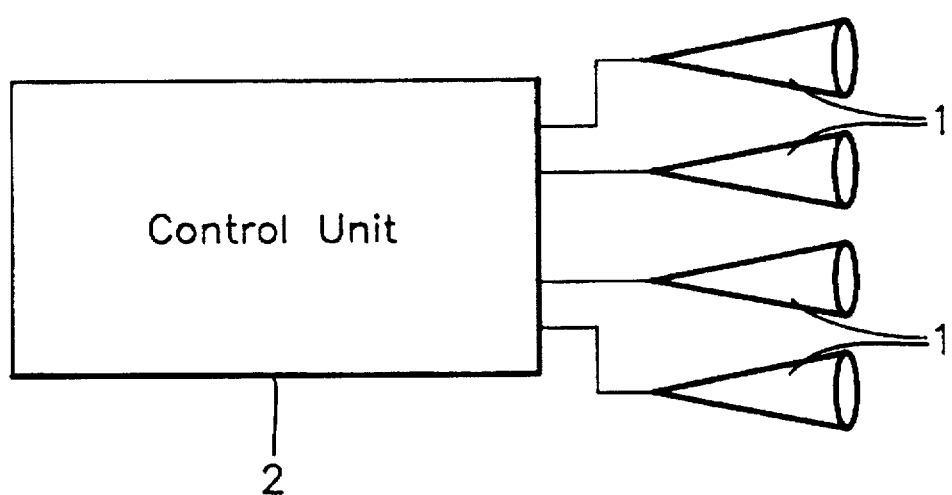
FIG. 2 is a block diagram schematically illustrating an apparatus in accordance with a preferred embodiment of the present invention.

Upon activation the sound generators 1, which according to the preferred embodiment are at least four, as illustrated in FIG. 2 will transmit sound signals with a sound level of preferrably 110 dB and up with periodically varying frequencies and a phase shift between the different sound signals from different generators sound signals have a frequency which rises successively from a basic frequency up to a top frequency and then abruptly returns to the basic frequency. This is repeated continuously when the alarm is working. The phase shift between the different frequency sounds emitted from different generators is of the order of milliseconds after the time when a first signal has the basic frequency, etc. This means that with four sound generators 1 all the time four different sound signals will sound, which is experienced as unendurable, and staying in this sound will immediately lead to physical symptoms such as sickness and pain in the chest. The symptoms will cease within a couple of hours and no remaining problems have yet been revealed.

Without being bound to any specific scientific explanation, it seems that the phenomenon could be explained as follows. The protective mechanisms of the ear can protect the organ of hearing from harmful sounds at two different frequencies at least. With sounds on three frequencies discomfort is experienced, but at least some people can bear this for a certain time period. The protective mechanisms of the ear, however, can not defend themselves against the corresponding sound on four frequencies, which will lead to the above discussed symptoms.

A suitable arrangement of sound generators for performing the method according to the invention for the protection of a room comprises sound generators mounted along opposite limitation walls and directed toward each other such that the sound waves meet in the middle of the room. For example, four sound generators 1 arranged side by side might be mounted on each side. Hereby a mat of sound is formed, within which nobody can stay without great discomfort.

In order to avoid that someone with the aid of a counter-sound generator extinguishes the sound, according to the preferred embodiment, the basic frequency is altered at certain time intervals, e.g. every tenth second.

The electronics required for the control of the sound generators are preferably contained in a control unit 2, and their mutual relationship are based on known technology, with which the man skilled in the art is well aquainted, and it does not constitute any part of the present invention and is therefore not described in detail.

I claim:

1. A method for preventing trespassing and un-authorized staying in an area, said method comprising the steps of:

emitting a sound signal from each of at least four sound generators in such a direction that the sound signals from the sound generators meet within said area, each sound signal having a frequency which is audible to humans and which is different from frequencies of other ones of said sound signals being emitted by other ones of said sound generators, each sound signal being out of phase with the other sound signals emitted by other ones of said sound generators; and periodically varying the frequency of each sound signal.

2. The method according to claim 1, wherein said step of periodically varying comprises periodically raising the frequency of each sound signal from a basic frequency and returning the frequency of said sound signal to the basic frequency.

3. The method according to claim 1, wherein said step of periodically varying comprises periodically raising the frequency of each sound signal from a basic frequency and abruptly returning the frequency of said sound signal to the basic frequency.

4. The method according to claim 1, wherein a basic frequency for each sound signal is changed after a certain predetermined time interval.

5. The method according to claim 4, wherein the basic frequency is changed every tenth second.

6. The method according to claim 1, wherein a phase shift between the sound signals is in the order of milliseconds.

7. The method according to claim 1, wherein each sound signal has a sound level of 110 dB and up.

8. An apparatus for preventing trespassing and unauthorized staying in an area, said apparatus comprising control means and at least four sound generators, each of said at least four sound generators being arranged so as to emit a respective sound signal such that each sound signal has a frequency which is audible to humans and which is different from that of other sound signals being emitted from other ones of said at least four sound generators, said at least four sound generators being responsive to said control means such that each sound signal is out of phase with respect to other ones of said sound signals, said at least four sound generators being further responsive to said control means such that the frequency of each sound signal varies periodically.

* * * * *